| | | |
|---|---|---|
| United States Patent [19] | [11] | 4,244,029 |
| Hogan et al. | [45] | Jan. 6, 1981 |

[54] DIGITAL VIDEO CORRELATOR

[75] Inventors: James J. Hogan; Charles O. Lambert; Gene A. Wallace, all of Akron, Ohio

[73] Assignee: Goodyear Aerospace Corporation, Akron, Ohio

[21] Appl. No.: 859,403

[22] Filed: Dec. 12, 1977

[51] Int. Cl.³ .................. G06F 15/336; G06K 9/62
[52] U.S. Cl. .................................. 364/728; 364/515; 340/146.3 Q
[58] Field of Search .................. 364/515, 728; 340/146.3 Q

[56] References Cited

U.S. PATENT DOCUMENTS

| | | | |
|---|---|---|---|
| 3,492,646 | 1/1970 | Bene et al. | 340/146.3 Q |
| 3,576,534 | 4/1971 | Steinberger | 340/146.3 Q |
| 3,670,151 | 6/1972 | Lindsay et al. | 364/728 |
| 3,706,071 | 12/1972 | Gray | 340/146.3 Q |
| 3,725,689 | 4/1973 | Kautz | 364/728 |
| 3,831,013 | 8/1974 | Alsup et al. | 364/728 |
| 3,878,509 | 4/1975 | Kikuchi et al. | 340/146.3 Q |
| 3,900,721 | 8/1975 | Speiser et al. | 364/728 |
| 3,952,299 | 4/1976 | Hodge et al. | 364/728 |
| 3,976,982 | 8/1976 | Eiselen | 364/515 |
| 4,162,481 | 7/1979 | DuVall | 364/728 |

OTHER PUBLICATIONS

Habibi et al., "A Survey of Digital Picture Coding," *Computer*, May 1974, pp. 22–34.

Barnea et al., "A Class of Algorithms for Fast Digital Image Registration," *IEEE Transactions on Computers*, vol. C-21, No. 2, Feb. 1972, pp. 179–186.

*Primary Examiner*—Howard A. Birmiel

*Attorney, Agent, or Firm*—P. E. Milliken; E. W. Oldham; R. L. Weber

[57] ABSTRACT

A digital video correlator wherein a reference image and a live image are digitized and compared against each other in a shifting network to determine the correlation or degrees thereof existing between the two images. Fundamentally, the invention includes a video digitizer which divides live and real images from various sources into picture elements and digitizes those elements to fixed voltage levels. The digitized live image is passed to a dynamic memory consisting of a plurality of interconnected shift registers while the digitized reference image is maintained within a first set of shift registers comprising a portion of a processor. A second set of shift registers within the processor maintain therein a mask function. Yet a third set of shift registers within the processor are interconnected in parallel to the dynamic memory to receive, under control of a clock, the digitized data of the live image. As the live image data is shifted through the third set of shift registers, single-bit correlators interconnecting corresponding bits of each of the first, second, and third sets of shift registers, compare the digitized values of the corresponding bits, with such comparison being enabled or negated by the mask function. The outputs of all the single-bit correlators are summed together with that sum indicating the degree of correlation, on a bit-by-bit basis, between the live and reference images. Further circuitry is included to determine the point of best correlation between the two images and to normalize or take the mean value of the correlation output.

19 Claims, 7 Drawing Figures

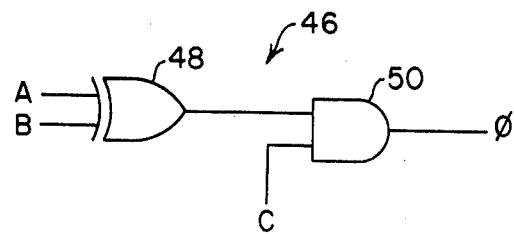
FIG. 4A
FIG. 4
FIG 4B
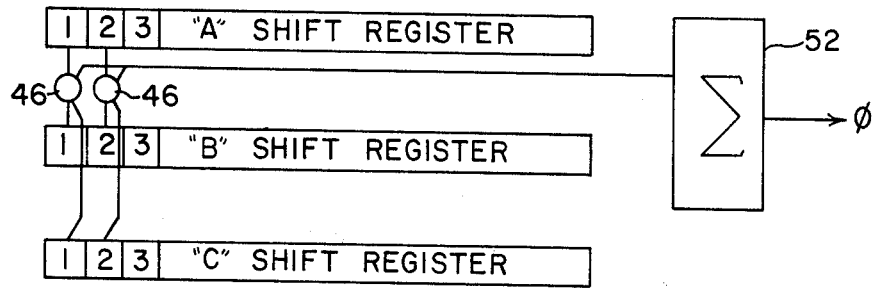
FIG. 5
FIG. 6
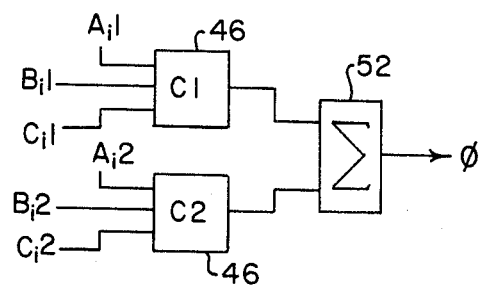
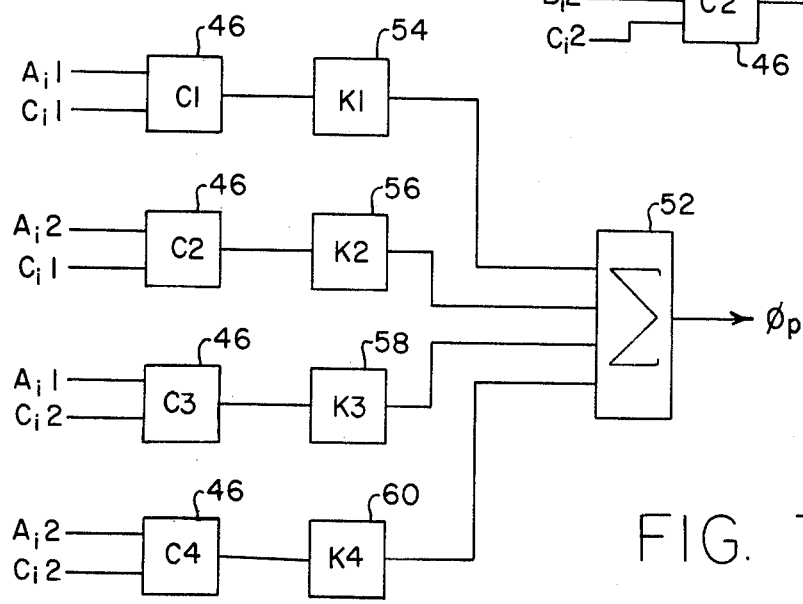
FIG. 7

DIGITAL VIDEO CORRELATOR

BACKGROUND OF THE INVENTION

Heretofore, numerous types of optical image correlators have been known whereby a live or real scene may be correlated with a reference image in such a manner that an output signal, indicative of the degree of correlation between the two, is produced. Such optical image correlators have been most generally used in guidance systems for aircraft, missiles, and the like. Applicants are particularly aware of U.S. Pat. Nos. 3,723,717; 3,751,705; 3,748,042; 3,496,290; 3,514,535; 3,564,126; and 3,609,762, all of which are assigned to Goodyear Aerospace Corporation of Akron, Ohio, the assignee of the instant invention. All of the foregoing prior art references teach an optical image correlator wherein a photocathode converts light impinging thereupon into a corresponding electron stream which is accelerated through a vacuum tube for storage on a storage grid. The electron stream is focused onto the storage grid by means of an electromagnetic coil or the like. A collecting screen is provided closely adjacent the storage grid to accommodate secondary emissions therefrom. With the reference image so stored, a live image may be converted into an electron stream and directed toward the storage grid. This electron stream is nutated by means of electromagnetic deflection so that the live image is nutated over the reference image maintained upon the storage grid. Electrons passing through the grid are sensed at an anode which produces an output current directly related to the degree of correlation existing between the live input image and the reference image maintained on the storage grid. A further detailed understanding of the prior art may be had by reference to the foregoing prior art citations.

While the prior art approach to optical image correlation has been generally satisfactory, certain problems have been existent therewith. Indeed, all problems commonly inherent with vacuum tubes have been experienced in the use of such correlators. The inaccuracies incident to the utilization of magnetic deflection coils for nutation and focusing have been difficult and expensive to circumvent or overcome. The susceptibility of such systems to damage by the jolting and jarring characteristic of their operational environment has been ever present. The prior art teachings have, by and large, utilized a totally analog technique in the correlation process and, consequently, have suffered from the inaccuracies inherent therewith. In general, the prior art has suffered from a lack of a digital solid state optical image correlating apparatus and technique.

OBJECTS OF THE INVENTION

In light of the foregoing, it is an object of the invention to present a digital video correlator wherein digitized video data, representing both a reference and a real image, is utilized in the correlation process.

A further object of the invention is to present a digital video correlator which is capable of processing digitized data in real time.

Yet another object of the invention is to present a digital video correlator which obviates the inherent drawbacks of electromagnetic data shifts by implementing solid state shift registers which digitally shift the data.

Still a further object of the invention is to present a digital video correlator which is conducive to operation in either a multi-level product mode or a multi-level difference mode of correlation.

Still another object of the invention is to present a digital video correlator which is impervious to the adverse effects of physical jarring, vibrations, temperature changes, contrast reversals, and the like.

Yet another object of the invention is to present a digital video correlator which is simplistic in design, reliable in operation, relatively inexpensive to construct, and readily conducive to implementation utilizing state-of-the-art elements.

SUMMARY OF THE INVENTION

The foregoing objects and other objects of the invention which will become apparent as the detailed description proceeds are achieved by a digital video correlator for comparing a live image with a reference image, comprising: digitizing means for dividing the live and reference images into pixels and digitizing said pixels into fixed voltage levels; shifting means connected to said digitizing means for receiving in sequential order the digitized pixels of the live image; and correlator means interconnected between said digitizing means and said shifting means for receiving and maintaining in sequential order the digitized pixels of the reference image and receiving the digitized pixels of the live image from said shifting means, said correlator means comparing corresponding pixels of the live and reference images with each other and producing an output indicative of the correlation therebetween.

DESCRIPTION OF THE DRAWINGS

For a complete understanding of the objects, techniques, and structure of the invention, reference should be had to the following detailed description and accompanying drawings wherein:

FIG. 4, comprising FIGS. 4A and 4B, respectively presents a schematic of the correlator logic for one bit of video data and a truth table respecting the operation thereof;

FIG. 5 is a functional block diagram showing the interrelationship of a reference image shift register, real image shift register, mask shift register, and the one-bit correlator of FIG. 4A;

FIG. 6 is a block diagram of a correlator according to the teachings of the invention operating in the mode of multi-level difference correlation; and FIG. 7 is a block diagram of a correlator according to the teachings of the invention operating in the mode of multi-level product correlation.

DETAILED DESCRIPTION OF THE PREFERRED EMBODIMENT

Figure 1:
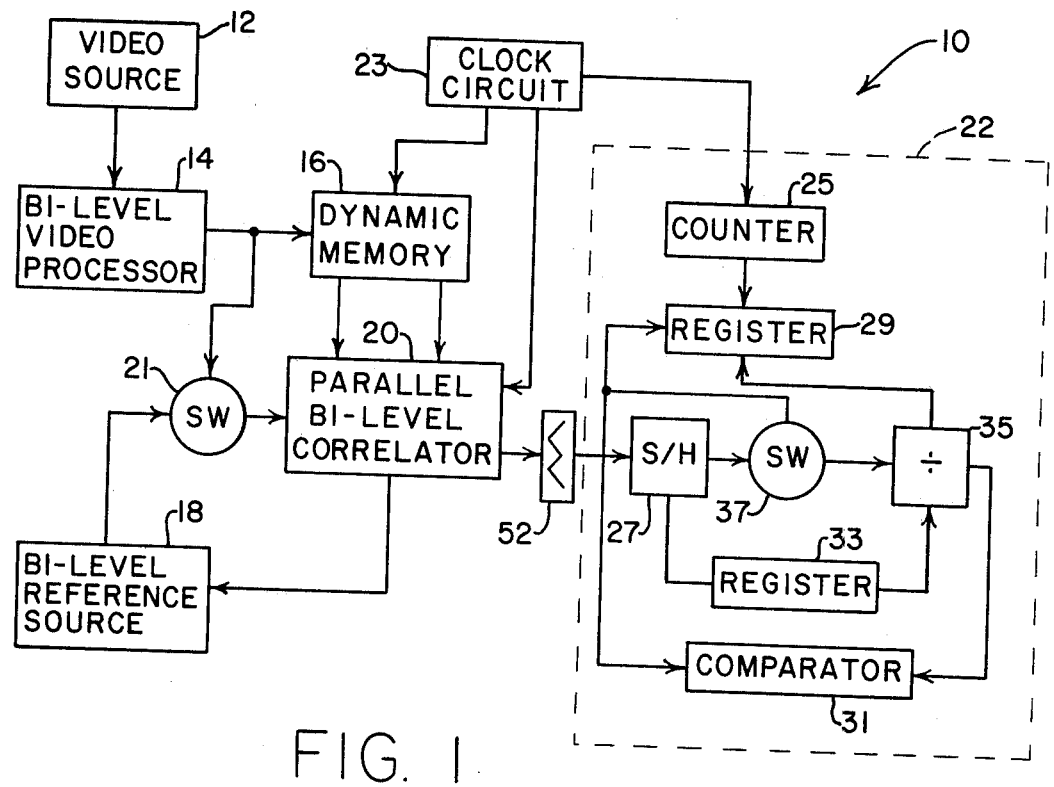
FIG. 1 is a functional block diagram of the digital video correlator system of the invention.

Referring now to the drawings, and more particularly to FIG. 1, it can be seen that a digital video correlator system of the invention is designated generally by the numeral 10. A video source 12 of any suitable nature, such as a TV raster scan, radar, or the like, supplies analog video data to a bi-level video processor 14. While the processor 14 will be described in further detail hereinafter, it should be noted that the same digitizes the data such that analog levels falling above, below, or within certain levels, are respectively designated by fixed output states. The digitization of the analog signal may be accomplished using state-of-the-art apparatus in a manner to be discussed herein with respect to FIG. 2. Generally, a running average of the incoming live image is maintained and constantly updated. Discrete picture elements or pixels are digitized and represented by a fixed level or levels of digital data in accordance with each respective pixel's relationship to the running means or average value of the incoming live image. The output of the video processor 14 is passed to a dynamic memory 16 comprising a plurality of shift registers capable of shifting, in parallel, a plurality of data bits to the parallel bi-level correlator 20. Also feeding the correlator 20 is a bi-level reference source 18, again maintaining digitized data of a reference image on a pixel-by-pixel basis. A switch 21 is interposed between the correlator 20 and the reference source 18 and processor 14. The switch 21 controls whether the reference for correlation is to be supplied from the real image from the source 12 and digitized by the processor 14, or from the bi-level reference source 18. Suffice it to say that the reference source 18 may consist of a plurality of shift registers, or may instead be a magnetic tape containing thereon sequential digitized data of the pixels of a reference. Image data may also be transferred from the correlator 20 to the reference source 18 for storage via the line 23.

As will become apparent hereinafter, the correlator 20 compares the live image of the dynamic memory 16 with the reference image supplied from either the reference source 18 or the video processor 14. In either event, the digital correlations are made on a pixel-by-pixel basis by the correlator 20 with each pixel correlation producing an output of fixed amplitude. The correlation output for each reference pixel, when compared to each live image pixel, is summed via a current summing switch 52, to be discussed hereinafter, and supplied to the track sample/hold position logic 22. This logic 22, readily conceivable to those skilled in the art, may comprise a standard sample and hold circuit 27 sensing and recording the maximum amplitude outputs of the correlator 20 as shown. The circuit 22 further includes a counter 25 fed by clock circuitry 23 which also controls the dynamic memory 16 as will be discussed hereinafter. The counter is in turn connected to a register 29 which is enabled by the sample and hold circuit 27. When the sample and hold circuit 27 senses a new high level from the correlator 20 and current summing switch 52, the register 29 is enabled to receive therein the count of the counter 25, thus maintaining therein the position address of the highest degree of correlation achieved by the correlator 20. Of course, the sample and hold circuit may also feed a comparator 31 which determines whether or not the highest degree of correlation achieved by the correlator is indeed indicative of a match between the reference and live image.

Figure 2:
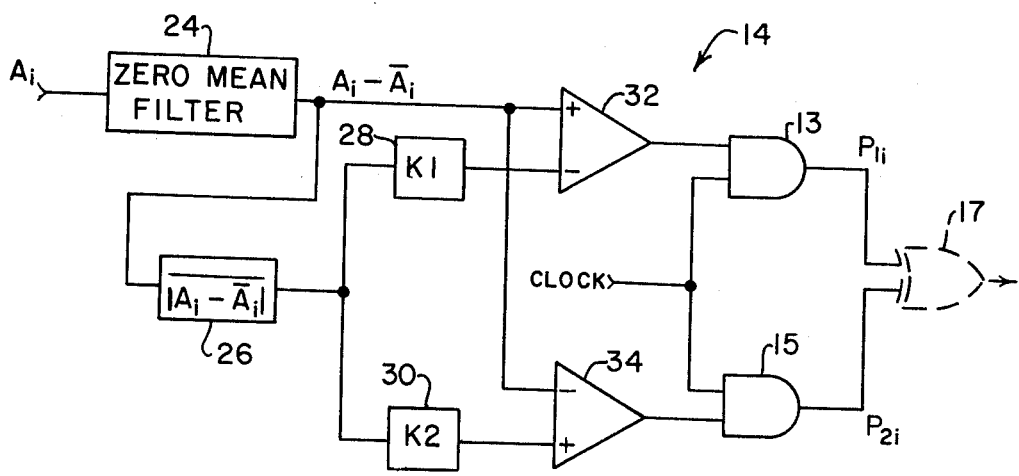
FIG. 2, presents a circuit schematic of a binary video processor of the type which might be incorporated into the system of FIG. 1, for digitizing analog video input signals.

With reference now to FIG. 2, it can be seen that the video processor 14 includes a zero-mean filter receiving the multi-level analog video input signal $A_i$ from the video source 12. The filter 24 generates a running average of the input $A_i$ over the time constant of the filter, this average being designated $\bar{A}_i$, such that the output of the high pass filter 24 is the zero-mean video signal $A_i - \bar{A}_i$. The circuit 26 generates the standard deviation of the input video signal by summing the absolute value of $A_i - \bar{A}_i$ over the time constant of the filter. This standard deviation is applied to gain control circuits 28,30 having respective preselected gains of K1 and K2. The amplified outputs of the circuits 28,30 are respectively applied to the comparators 32,34 which receive as other inputs thereto the zero-mean video signal $A_i - \bar{A}_i$ from the high pass filter 24.

As will be appreciated hereinafter, the correlator 20 operates on video data in a binary form and the video data may be in a bi-level or multi-level format. In the video processor 14 of FIG. 2, the comparator 32 produces a positive output only when the zero-mean video signal $A_i - \bar{A}_i$ is greater than K1 times the standard deviation, and the comparator 34 produces a positive output only when that signal is less than $-K2$ times the standard deviation. Hence, the circuit of FIG. 2 is capable of characterizing an analog input signal with respect to three levels, for tri-level correlation to be discussed hereinafter. Such characterizing may be translated to binary form via the AND gates 13,15. With the AND gate being enabled by the clock as shown, each clock pulse defines a pixel with the output of the gate 13 establishing, for instance, the least significant bit of the binary value of the pixel and the gate 15 establishing the most significant bit.

For bi-level correlation, the circuit of FIG. 2 need only be slightly modified such that K1=0 and K2=$-\infty$. In such a case, P2i will always be a logic zero (most significant bit) and P1i will be a logic one when $A_i$ is greater than $\bar{A}_i$, and a logic zero otherwise. In such a case, a single bit of binary data, P1i, is necessary for each pixel.

When an infrared (IR) sensor is used for acquiring the live image video data signal for the system 10, it is desirable that the video processor 14 be made insensitive to contrast reversals. Since IR sensors are temperature sensitive, a contrast reversal may occur with a change in ambient temperature, rain, or the like. By feeding the outputs of the AND gates 13,15 to the exclusive OR gate (EOR) 17, shown in phantom, the circuit of FIG. 2 may be caused to function in the bi-level mode while being unaffected by contrast reversals. In such a situation, the output of the gate 17 is a logic zero if $A_i - \bar{A}_i$ is between K1 times the standard deviation and $-K2$ times the standard deviation, while being a logic one at all other times.

Before entering into a detailed consideration of the circuitry of the system 10, attention should first be given to the general concept of the correlation functions to be performed. When operating upon bits of binary data, the invention basically performs the following bi-level function:

$$\phi = \sum_{i=1}^{n} |A_i - B_i| C_i \qquad \text{EQUATION 1}$$

Where $\phi$ is a correlation function, $A_i$ is bit-i of n such bits, $B_i$ is bit-i of n such bits, and $C_i$ is bit-i of a masking or gating function associated with each of the bits of A and B. Equation 1 simply states that the correlation function for n-bits of data from field A, when compared with n-bits of data from field B, on a bit-by-bit basis as selected by the value of C, is equal to the summation over n of the absolute difference of the A field and B field logically ANDed with the C field.

The correlation function for the mean absolute difference (MAD) is defined in equation 2 below:

$$\phi_{MAD} = \frac{\sum_{i=1}^{n} |A_i - B_i| \, C_i}{\sum_{i=1}^{n}} \qquad \text{EQUATION 2}$$

With the C field or array comprising the enabling function determining which bits of the A and B fields are to be correlated, the mean absolute difference (MAD) is readily determined in equation 2 by dividing equation 1 by the summation of Ci over the field of n-bits. It should be readily appreciated that the summation of Ci may be obtained from equation 1 by setting either the field A or the field B to all ones, with the other field being set to all zeros, and then performing the correlation function of equation 1.

Utilizing the fields A, B, and C, a summation of products correlation may be performed utilizing the correlation function of equation 1 by setting the B field to zero, thus achieving a product correlation $\phi_p$ as set forth below in equation 3:

$$\phi_p = \sum_{i=1}^{n} A_i C_i \qquad \text{EQUATION 3}$$

The aperture correlation function $\phi_A$ may be derived from the correlation function of equation 1 by setting the B array to zeros and the C array to ones as set forth in equation 4 below:

$$\phi_A = \sum_{i=1}^{n} A_i \qquad \text{EQUATION 4}$$

Knowing the aperture correlation function $\phi_A$ and the product correlation function $\phi_p$, one may obtain an aperture normalized product as set forth in equation 5 below:

$$\phi_N = \frac{\phi_P}{\phi_A} = \frac{\sum_{i=1}^{n} A_i C_i}{\sum_{i=1}^{n} A_i} \qquad \text{EQUATION 5}$$

It should now be apparent that the correlation technique presented herein can be configured to perform the above algorithm with multi-level inputs of A, B, and C, by appropriate coding, scaling, and bit-slicing the data. This will become further apparent as the detailed description proceeds. For present consideration, in the case of a two-bit, tri-level MAD, equation 2 becomes:

$$\phi_{MAD} = \frac{\sum_{i=1}^{n} \{|A_{i2} - B_{i2}| + |A_{i1} - B_{i1}|\} \, C_i}{\sum_{i=1}^{n} C_i} \qquad \text{EQUATION 6}$$

wherein $A_{i2}$ and $B_{i2}$ are the most significant bits of elements $A_i$ and $B_i$ respectively, while $A_{i1}$ and $B_{i1}$ are the least significant bits thereof. Equation 6 is derived from equation 2 above if the data is coded in accordance with chart 1 below:

CHART 1

| $B^A$ | 2<br>0101 | 1<br>0001 | 0<br>0000 | −1<br>0010 | −2<br>1010 |
|---|---|---|---|---|---|
| 2  0101 | 0 | 1 | 2 | 3 | 4 |
| 1  0001 | 1 | 0 | 1 | 2 | 3 |
| 0  0000 | 2 | 1 | 0 | 1 | 2 |
| −1 0010 | 3 | 2 | 1 | 0 | 1 |
| −2 1010 | 4 | 3 | 2 | 1 | 0 |

Chart 1 above illustrates the correlation relationship between data A and data B for as many as five levels. When A and B consist of five-level data, the correlation function $\phi$ is defined by the entire chart. When A and B consist of four-level data, the portion of the chart encompassing values of A and B from −1 to 2 are used and A and B consist of three binary bits each. In three-level correlation, the portion of the chart incorporated lies in the area where A and B lie between 1 and −1 and consist of two bits of binary data. Finally, as discussed above, for bi-level correlation, the chart reduces to where A and B are either zero or one and are expressed by a single bit of binary data.

It should be readily apparent that a multi-level correlation of two-bit data may be accomplished in the same manner as single-bit correlation with the requisite increase in hardware being made. If the elements to be correlated are represented by binary elements of Q-bits each, the number of levels of correlation possible is Q+1 when A and B are coded to achieve equation 1 for the multi-level.

The sum of products for a two-bit input correlation on A and C (B is made zero) is given by equation 7:

$$\phi_p = \sum_{i=1}^{n} \{A_{i1}C_{i1} + 2(A_{i2}C_{i1}) + 2(A_{i1}C_{i2}) + 4(A_{i2}C_{i2})\} \qquad \text{EQUATION 7}$$

The truth table for this correlation is given in chart 2:

CHART 2

| A | C | K1 | A1 | C1 | K2 | A2 | C1 | K2 | A1 | C2 | K3 | A2 | C2 | $\phi P$ |
|---|---|---|---|---|---|---|---|---|---|---|---|---|---|---|
| 0 | 0 | 1 | 0 | 0 | 2 | 0 | 0 | 2 | 0 | 0 | 4 | 0 | 0 | 0 |
| 1 | 0 | 1 | 1 | 0 | 2 | 0 | 0 | 2 | 1 | 0 | 4 | 0 | 0 | 0 |
| 2 | 0 | 1 | 0 | 0 | 2 | 1 | 0 | 2 | 0 | 0 | 4 | 1 | 0 | 0 |
| 3 | 0 | 1 | 1 | 0 | 2 | 1 | 0 | 2 | 1 | 0 | 4 | 1 | 0 | 0 |
| 0 | 1 | 1 | 0 | 1 | 2 | 0 | 1 | 2 | 0 | 0 | 4 | 0 | 0 | 0 |
| 1 | 1 | 1 | 1 | 1 | 2 | 0 | 1 | 2 | 1 | 0 | 4 | 0 | 0 | 1 |
| 2 | 1 | 1 | 0 | 1 | 2 | 1 | 1 | 2 | 0 | 0 | 4 | 1 | 0 | 2 |
| 3 | 1 | 1 | 1 | 1 | 2 | 1 | 1 | 2 | 1 | 0 | 4 | 1 | 0 | 3 |
| 0 | 2 | 1 | 0 | 0 | 2 | 0 | 0 | 2 | 0 | 1 | 4 | 0 | 1 | 0 |
| 1 | 2 | 1 | 1 | 0 | 2 | 0 | 0 | 2 | 1 | 1 | 4 | 0 | 1 | 2 |
| 2 | 2 | 1 | 0 | 0 | 2 | 1 | 0 | 2 | 0 | 1 | 4 | 1 | 1 | 4 |
| 3 | 2 | 1 | 1 | 0 | 2 | 1 | 0 | 2 | 1 | 1 | 4 | 1 | 1 | 6 |
| 0 | 3 | 1 | 0 | 1 | 2 | 0 | 1 | 2 | 0 | 1 | 4 | 0 | 1 | 0 |
| 1 | 3 | 1 | 1 | 1 | 2 | 0 | 1 | 2 | 1 | 1 | 4 | 0 | 1 | 3 |
| 2 | 3 | 1 | 0 | 1 | 2 | 1 | 1 | 2 | 0 | 1 | 4 | 1 | 1 | 6 |
| 3 | 3 | 1 | 1 | 1 | 2 | 1 | 1 | 2 | 1 | 1 | 4 | 1 | 1 | 9 |

In the foregoing case of a two-bit input product correlation, the aperture function $\phi_A$ is generated from equation 4 to be:

$$\phi_A = \sum_{i=1}^{n} (A_{i1} + 2A_{i2}) \qquad \text{EQUATION 8}$$

A multi-level product correlation normalized over the aperture for a two-bit input may thus be achieved by dividing equation 7 by equation 8 as defined in equation 5.

It should be appreciated that the C field may operate as a masking or enabling field to define the data to be processed with the correlation technique. It should further be appreciated that the product correlation technique may be easily expanded to accommodate plural levels by merely duplicating the equipment required for the two-level system. For example, in the system 10 of FIG. 1, for a multi-level product correlation, the number of correlators necessary would be $Q^2$, wherein Q is the number of bits of each data element to be correlated. The number of levels achieved is $2^Q$.

Figure 3:
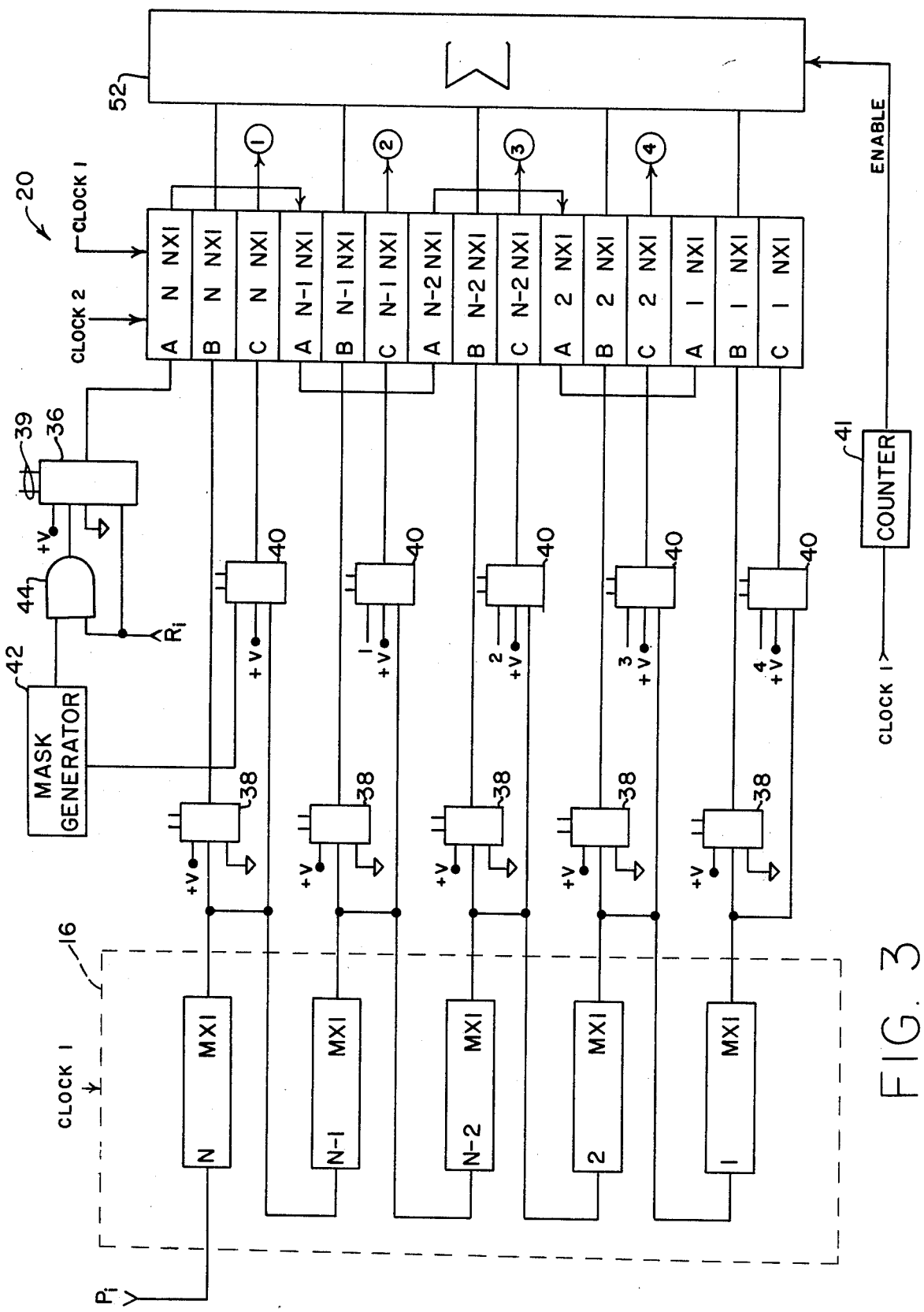
FIG. 3 is a schematic of the interrelationship of the dynamic memory and digital correlator of the invention.

With an appreciation of the general concepts presented above, reference should now be had to FIG. 3, wherein there is shown a particular embodiment of the invention. Here it is shown that the dynamic memory 16 comprises N shift registers of M bits each, with the shift registers being interconnected to shift data therethrough under control of the pulses of Clock 1 of the clock circuitry 23. The data supplied to the dynamic memory 16 comprises the digitized pixels Pi from the video processor 14 as shown in FIG. 1. The correlator 20 comprises three sets of N shift registers of N bits each for purposes of receiving and storing the digitized data of the reference image pixels Ri, the digitized data of the live image pixels Pi, and a control mask. It will be noted that the three sets of shift registers have been designated as the A, B, and C registers to be consistent with the algorithms presented hereinabove.

The A shift registers of the correlator 20 are supplied by a data gate 36 which, as is well known in the art, is capable of supplying one of four inputs to the output thereof under control of the address lines. As shown in FIG. 3, the data gate 36 may supply to the A registers either a logic 1 from the +V source, a logic 0 from the ground source, the digitized reference image Ri from the reference source 18, or a masked reference image supplied via the AND gate 44 receiving inputs from the mask generator 42 and reference source 18. The data bits supplied through the data gate 36 are received by the A shift register on a bit-by-bit basis under control of Clock 2 of the clock circuitry 23, with the data being serially shifted through the N A registers until the entire register is loaded.

The B shift registers of the correlator 20 receive data through data gates 38 which are similar in nature to the data gates 36 feeding the A registers. The data sources available to the B registers are logic 1's from the +V source, logic 0's from the ground source, and the digitized data bits corresponding to the pixels of the live image as supplied from the video processor 14 and maintained within the N M×1 shift registers of the dynamic memory 16. It can be seen that the video data of the live image is shifted into the shift registers of the memory 16 under control of Clock 1 and the same is done in a serial fashion. However, when this live image data is to be shifted into the processor 20, and more particularly the B registers thereof, the same is done in parallel fashion with each of the N registers of the memory 16 feeding through an associated data gate 38 and into a corresponding B register of the correlator 20, again under control of Clock 1.

The C registers of the correlator 20 are supplied through the data gates 40 with either a logic 1 supplied via the +V source, a mask supplied via the mask generator 42, or live image data supplied from the dynamic memory 16. It will be seen that when the C registers are to receive only a mask from the mask generator 42, the same may be achieved in serial fashion under control of Clock 2, with the output of C register N feeding the input of C register N-1 through the data gate 40. The C registers may also be loaded in parallel fashion as by a loading of all logic 1's via the +V input, or loading of the live image data from the dynamic memory 16 and through the associated AND gates 44 under control of Clock 1.

Interconnecting corresponding bits of each of the A, B, and C registers of the correlator 20 are a plurality of correlator logic circuits 46 as shown in FIG. 4A. An exclusive OR (EOR) gate 48 receives an input from one bit of the A register and a corresponding bit from the B register. The output of the EOR gate 48 is supplied to a standard AND gate 50 which receives as a gating input thereto the corresponding bit from the C register. Functionally, then, the circuit 46 performs the Boolean operation of $(A\phi B) C$ as set forth in the truth table of FIG. 4B. It will be apparent from the truth table of 4B that when the corresponding A and B bits are the same, the output $\phi$ is at a logic 0, while disparity between these bits is noted by a logic 1. When the C input is a 0, $\phi$ is a 0 regardless of the correlation or disparity between the corresponding A and B bits.

It will be understood that complementary logic could readily be used to achieve a desired correlation technique consistent with the teachings herein. Adaptation of complementary logic to the instant invention is deemed to be within the capabilities of one skilled in the art and the same is merely a variation on the basic theme of the preferred embodiment disclosed.

The interconnection of the single-bit correlation circuits 46 with the A, B, and C registers is shown in FIG. 5, and it can be seen that the outputs thereof are connected together to supply a current summing switch 52 or other appropriate summing network indicative of the aggregate of correlation between corresponding bits of the A, B, and C registers. With a single-bit correlator circuit 46 being associated with each of the $N^2$ bits of the A, B, and C registers, it will be appreciated that the current summing switch 52 will receive $N^2$ signals which are summed together to determine the degree of correlation existing between the data in the A and B registers as masked by the C register. It will be apparent from the truth table of FIG. 4B that the output signal of the current summing switch 52 will be minimized at the maximum number of correlations and maximized at the minumum number of correlations. In other words, the correlation signal output from the summing circuit 52 will be a negative going pulse, with that pulse hitting a minimum level at that point of maximum correlation. It is this output signal which is sensed by the sample and hold circuit 27 of the circuitry shown in FIG. 1.

A counter 41 may be provided for enabling the current summing switch 52 only after the dynamic memory 16 has filled the B or C registers with live image data to accomplish the desired correlation function. In the circuit of FIG. 3, it would require N(M+1) pulses of Clock 1 to load the dynamic memory 16 and either the B or C registers and, hence, the counter 41 could function to enable the switch 52 at that point. Of course, the counter 41 could be decoded for enabling the switch 52 at any desired time, depending on the function to be performed by the system 10.

It will be understood that the instant invention is utilized for tracking or guidance systems wherein a live image is compared with a reference image, with the degree of correlation therebetween being indicative of whether or not the system is operating on target. As was brought out with respect to the description of the single-bit correlator circuitry of FIG. 4A, the C registers supply an enabling input to the AND gate 50, and hence serve as a mask respecting the functioning of the single-bit correlator circuitry 46. The mask maintained within the C register selects, by enabling the various single-bit correlators 46, that portion of the reference image to be compared with the live image and, hence, effect the output of the correlator 20. Effectively then, the shift register C provides for an adaptive aperture such that as the field of view of the live image becomes smaller, as a missile or the like utilizing the system 10 closes in on its target, that portion of the reference image necessary for tracking similarly becomes smaller, and the mask serves to isolate that portion of the reference image which becomes important during closure. While it is not important for an appreciation of the invention presented herein, simultaneous with closure, different scaling of the images is required, since the field of view becomes smaller and the live target becomes larger. Similarly, the actual reference image itself may be changed by reloading through the data gate 36 and into the A registers. Generally speaking, the mask, which may be maintained within the C register, causes the correlator to zero-in on the target maintained within the reference image as closure occurs.

With an understanding of the masking technique and a further appreciation of the circuitry of FIGS. 3 and 4, attention may now be had to the implementation of the algorithms presented above through the circuitry of the invention. With particular attention to equation 1, it can be appreciated that an absolute difference correlation may be easily performed by loading, for example, a reference image into the A register from the reference source 18 via the data gate 36. Simultaneously with the loading of the reference image, a mask may be loaded from the mask generator 42 through the data gate 40 and into the C register. With the reference image and mask so stored, the Clock 1 may load the dynamic memory 16 from the video processor 14 in serial fashion. Cocurrent with the serial loading and shifting of data within the dynamic memory 16, the live image is shifted in parallel through the data gates 38 and into the B register of the correlator 20. After N(M+1) Clock 1 pulses, the dynamic memory 16 and the B shift register of the correlator 20 are fully loaded, and the counter 54, being decoded to sense this situation, may enable the current summing switch 52. On each subsequent pulsing of Clock 1, the entire reference image maintained within the dynamic memory 16 is shifted serially by one pixel and the live image maintained within the B registers of the correlator 20 are similarly shifted in parallel. Hence, as Clock 1 continues to run, the live image, being constantly fed from the processor 14, shifts through every conceivable position within the B registers. At each shift, a bit-by-bit correlation is made via the single-bit correlator 46 and the correlation output function is sensed by the current summing switch 52. It will thus be readily appreciated that an absolute difference correlation between a live image and reference image may be conducted utilizing the circuitry of FIG. 3 as just discussed. Of course, the current summing switch 52 may supply an output to the sample and hold circuit 27 to determine the best match therebetween.

Utilizing the circuitry presented herein, a mean absolute difference (MAD) correlation as defined in equation 2 may be easily performed. In this case, the masking function may be loaded into the C register from the mask generator 42, and the A registers loaded with all 1's and the B registers loaded with all 0's, or vice-versa, at which time the MAD correlation function $\phi$ of equation 1 may be generated. The output then of the current summing circuit 52 will be equivalent to the denominator of equation 2, the summation of the mask bits maintained within the C register. This value may be maintained within the buffer register 33 of FIG. 1. The A register may then be filled with the reference image and the B register with the live image as in the manner discussed above and the operation required for the algorithm of equation 1 may be performed, this being the numerator of equation 2. The output of the buffer register 33 may be applied as a denominator to the divider 35, with the simultaneous correlations of the correlator 20 being supplied upon each Clock 1 pulse as the numerator. The MAD correlation of equation 2 is then easily performed as the live image shifts through the correlator 20.

The aperture normalized product correlation of equation 5 may be performed by loading a masked reference into the A register through the AND gate 44 and data gate 36 such that the A register contains the reference image masked by the masking function. Next, logic 0's may be loaded into the B registers via the data gates 38. At this time, the live image may be shifted via the data gates 40 through the C registers. Numerators for the algorithm of equation 5 are thus developed under control of Clock 1. Prior to the shifting of the live image through the C register, the C register may be loaded with all 1's with the B registers loaded with 0's to obtain the algorithm of equation 4, which is the denominator of equation 5. By storing that result in the buffer register 33 as the denominator for the divider 35 and by then applying to the divider 35 the sequentially acquired numerators discussed directly above, the algorithm of equation 5 may be performed to achieve an aperture normalized product correlation between the live and reference images.

The multi-level MAD correlation of equation 6 and chart 1 above may be performed utilizing the circuitry of the nature set forth in FIG. 6. It will be appreciated that the correlator 20 of FIG. 1 would be enlarged for such a correlation technique inasmuch as each digitized pixel requires multiple bits of binary data to establish its value, and hence, for the tri-level correlator of FIG. 7 operating on an equal number of pixels as that set forth in FIG. 1, the size of A, B, and C registers would be doubled. Similarly, there would be required twice as many single-bit correlators C1, C2 operating upon corresponding bits of the reference and live image data, the single-bit correlators being similar to the correlators 46 discussed above. The total correlation function $\phi$MAD between corresponding pixels of the reference and live images is the summation of the outputs of the single-bit correlators C1,C2 as set forth in chart 1. Again, all of the correlator elements 46 may feed to the single summing circuit 52 and the remainder of the system operates as set forth in FIG. 1.

But for the requisite increase in circuit size, the correlation function of equation 6 is obtained in the same procedural manner as that of equation 2. The denominator may be obtained by setting the A register to logic 1's and the B registers to logic 0's and performing the correlation of equation 1. The result may then be stored in the buffer register 33 for application to the divider 35. A new numerator may then be applied to the divider 35 on each Clock 1 pulse as the live image is stepped across the reference.

Depending upon the type of data required and/or the target area viewed or reference image utilized, it may be desirable to perform the correlation function as a multi-level product correlation. The aperture normalized multilevel product correlation of equations 7 and 8 and chart 2 may be performed via circuitry similar to that shown in FIG. 7. Again, a duplicity of single-bit correlators 46 (C1–C4) is necessary. As may be appreciated from chart 2, multipliers 54–60 are required to weight the values of the outputs of the correlators C1–C4. To achieve $\phi A$ of equation 8, the B register is loaded with 0's, the C register with 1's, and the A register with masked reference image data from the mask register 42, AND gate 44, and data gate 36. The output of the current summing switch 52 is then $2\phi A$ which may be supplied to the divider 35 and scaled down by a factor of two or be maintained at that value inasmuch as that value will be used as the denominator for all correlation functions to be performed as the live image is shifted through the C register. In any event, a factor of $\phi A$ is stored as a denominator in the divider 35. The live image, under control of Clock 1, is shifted through the C register with the correlations being performed as discussed above via the single-bit correlators 46 (C1–C4), and the outputs thereof are weighted by the multipliers 54–60 (K1–K4) per chart 2. The current summing switch 52 receives the weighted value outputs from the multipliers 54–60 and performs in the standard manner to apply subsequently received correlation outputs $\phi P$ of increasing value to the divider 35. Here, the normalized multi-level product correlation is obtained by dividing $\phi P$ by $\phi A$ in accordance with equation 5. The remainder of the circuitry of the system 10 functions in the manner described earlier such that a determination may be made as to the position address of the best correlation achieved.

Applicants have been able to produce a dual 128-bit correlator on a single chip by using large scale integration. Such a chip includes A, B, and C shift registers of 128 bits each, and 128 single-bit correlation circuits such as those shown in FIG. 4A. Such large scale integration has allowed applicants to house their video correlator in a compact and relatively lightweight unit while providing the accuracy and reliability demanded in such systems.

Thus it can be seen that the objects of the invention have been satisfied by the structure and techniques presented hereinabove. While in accordance with the patent statutes only the best mode and preferred embodiment of the invention has been presented and described in detail, it is to be understood that the invention is not limited thereto or thereby, and that various departures from the theme presented herein as to size, composition, configuration, and the like of the various elements of the invention will be readily conceivable to those skilled in the art. Consequently, for an appreciation of the true scope and breadth of the invention, reference should be had to the following claims.

What is claimed is:

1. A digital video correlator for comparing a live image with a reference image, comprising:
   digitizing means for dividing the live and reference images into pixels and digitizing said pixels into bits of binary data;
   a first shift register connected to said digitizing means for receiving, in sequential order, said bits of binary data of the digitized pixels of the live image;
   correlator means interconnected between said digitizing means and said first shift register for receiving and maintaining in sequential order the digitized pixels of the reference image and receiving the digitized pixels of the live image from first shift register, said correlator means comprising second, third, and fourth shift registers, corresponding bits of which are interconnected to a plurality of logic circuit means for producing an output corresponding to an exclusive OR function between corresponding bits of said second and third shift registers logically ANDed with the corresponding bit of said fourth shift register; and
   gating circuit means connected to said first, second, third, and fourth shift registers for gating selectable inputs to said registers, said gating means being interconnected between said first shift register and said third shift register for selectively gating binary ones, binary zeros, or the bits of binary data of the live image to said third shift register.

2. The digital video correlator according to claim 1 wherein said first shift register receives said bits of binary data for the live image in sequential order.

3. The digital video correlator according to claim 1 wherein each of said logic circuit means comprises an exclusive OR gate interconnected between corresponding bits of said second and third shift registers.

4. The digital video correlator according to claim 3 wherein each of said logic circuit means further includes an AND gate receiving as an input thereto the output of said associated exclusive OR gate and as another input thereto the bit of said fourth shift register corresponding to the bit of said second and third shift registers connected to the associated exclusive OR gate.

5. The digital video correlator according to claim 4 which further includes a summing circuit receiving and summing the outputs of each of said AND gates.

6. The digital video correlator according to claim 1 wherein said second shift register receives and maintains therein the bits of binary data for the reference image.

7. The digital video correlator according to claim 1 wherein said third shift register receives and maintains therein the bits of binary data for the live image.

8. The digital video correlator according to claim 7 wherein said fourth shift register is interconnected with a mask generator for receiving and maintaining a binary mask therein.

9. The digital video correlator according to claim 1 wherein said gating means is further connected to a mask generator for selectively gating a mask to said fourth register.

10. The digital video correlator according to claim 1 wherein said first shift register serially shifts the bits of data of the live image therethrough.

11. Apparatus for comparing bits of binary data of a reference image with bits of binary data of a live image, comprising:
   a first shift register receiving and maintaining bits of binary data of the reference image;
   a second shift register shifting the bits of binary data of the live image therethrough under control of a clock;
   a plurality of logic circuits, one interconnected between corresponding bits of each of said first and second shift registers, for producing output signals corresponding to the correlation between said corresponding bits;

a summing circuit interconnected to each of said plurality of logic circuits and summing said output signals to produce a correlation signal as an aggregate of said output signals; and a mask generator connected to a third shift register, corresponding bits of said third shift register being connected to the corresponding ones of said logic circuits which are connected to corresponding bits of said first and second shift registers.

12. The apparatus according to claim 11 wherein said mask generator and third shift register enable and inhibit said output signals of said logic circuits.

13. The apparatus according to claim 11 wherein each of said logic circuits comprises an exclusive OR gate interconnected between corresponding bits of said first and second shift registers, and an AND gate interconnected between said exclusive OR gate and said third shift register.

14. The apparatus according to claim 11 which further includes a fourth shift register serially shifting the bits of binary data of the live image therethrough, inputs of said second shift register being connected in parallel to outputs of said fourth shift register, the shifting of data through said second and fourth shift registers being under control of the same clock.

15. The apparatus according to claim 11 which further includes a plurality of multiplier circuits connected to outputs of certain of said logic circuits for weighting the output signals thereof and passing said weighted output signals to said summing circuit.

16. A digital video correlator for comparing a live image with a reference image, comprising:

digitizing means for dividing the live and reference images into pixels and digitizing said pixels into bits of binary data;

a first shift register connected to said digitizing means for receiving, in sequential order, said bits of binary data of the digitized pixels of the live image;

correlator means interconnected between said digitizing means and said first shift register for receiving and maintaining in sequential order the digitized pixels of the reference image and receiving the digitized pixels of the live image from said first shift register, said correlator means comprising second, third, and fourth shift registers, corresponding bits of which are interconnected to a plurality of logic circuit means for producing an output corresponding to an exclusive OR function between corresponding bits of said second and third shift registers logically ANDed with the corresponding bit of said fourth shift register;

gating circuit means connected to said first, second, third, and fourth shift registers for gating selectable input to said registers, said gating means being interconnected between said first shift register and said third shift register for selectively gating binary ones, binary zeros, or the bits of binary data of the live image to said third shift register; and wherein outputs of each of said logic circuit means are summed in a summing circuit and further including a divider circuit interconnected to said summing circuit for dividing the sum achieved by said summing circuit when a first set of inputs are selected by said gating circuit means by the sum achieved by said summing circuit when a second set of inputs are selected by said gating circuit means.

17. The digital video correlator according to claim 16 which further includes a third shift register in parallel connection with said first shift register at a plurality of points, a shifting of bits of binary data through said first register, through said second register, and from said first register to said second register being under control of a common clock.

18. A digital video correlator for comparing a live image with a reference image, comprising:

digitizing means for dividing the live and reference images into pixels and digitizing said pixels into bits of binary data;

a first shift register connected to said digitizing means for receiving, in sequential order, the digitized pixels of the live image;

correlator means interconnected between said digitizing means and said first shift register for receiving and maintaining in sequential order the digitized pixels of the reference image and receiving the digitized pixels of the live image from said first shift register, said correlator means comprising second, third, and fourth shift registers, corresponding bits of which are interconnected to a plurality of logic circuit means for producing an output corresponding to an exclusive OR function between corresponding bits of said second and third shift registers logically ANDed with the corresponding bit of said fourth shift registers;

gating circuit means connected to said first, second, third, and fourth shift registers for gating selectable inputs to said registers; and a mask generator connected to said gating means, said gating means masking the bits of binary data of the reference image gated to said second shift register.

19. The digital video correlator according to claim 18 wherein said gating means is connected to said second shift registers for selectively gating binary ones, binary zeros, or the bits of binary data of the reference image to said second register.

* * * * *